United States Patent
Singh

(10) Patent No.: US 7,651,718 B2
(45) Date of Patent: *Jan. 26, 2010

(54) METHOD FOR PREPARING CONSUMABLE VENDING MACHINE BEVERAGE

(75) Inventor: Harjit Singh, Woodbridge, CT (US)

(73) Assignee: Nature's First, Inc., Orange, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/214,703

(22) Filed: Aug. 29, 2005

(65) Prior Publication Data

US 2005/0287271 A1 Dec. 29, 2005

Related U.S. Application Data

(60) Division of application No. 10/877,469, filed on Jun. 25, 2004, which is a continuation of application No. 09/898,968, filed on Jul. 3, 2001, now Pat. No. 6,777,014.

(51) Int. Cl.
A23C 9/00 (2006.01)

(52) U.S. Cl. .................. 426/590; 426/580; 426/569; 426/593; 426/594; 426/596; 426/597; 426/453

(58) Field of Classification Search .............. 426/569, 426/593, 594, 596, 597, 453, 590, 580
See application file for complete search history.

(56) References Cited

U.S. PATENT DOCUMENTS 2,832,686 A  4/1958  Louder et al.
2,835,586 A  5/1958  Peebles
2,896,839 A * 7/1959  Barnes et al. ............ 383/211
2,933,393 A * 4/1960  Ortman .................... 426/588
2,964,407 A  12/1960 Sinnamon et al.

(Continued)

FOREIGN PATENT DOCUMENTS

DE  2122267 A  11/1972

(Continued)

OTHER PUBLICATIONS

U.S. Dairy Export Council (USDEC) Webpage. "Skim Milk Powder". http://www.web.archive.org/web/20020316043930/usdec.org/products/milkpowdersspecs May 16, 2001.*

(Continued)

*Primary Examiner*—Anthony Weier
(74) *Attorney, Agent, or Firm*—Daniel C. Crilly; Kevin P. Crosby; GrayRobinson, P.A.

(57) ABSTRACT

A device (e.g., a vending machine) and method for preparing a consumable beverage include mixing an agglomerated natural milk powder having a scorched particle mass not greater than fifteen milligrams with hot water to produce the consumable beverage. The hot water and milk powder may be mixed prior to or during their placement of the beverage in a beverage cup, such as part of operation of a vending machine. Alternatively, the hot water and milk powder may be mixed with one or more additional ingredients, such as coffee, tea, cocoa powder, and/or sugar, to produce the beverage. Further, the hot water and milk powder may be whipped together or with an additional ingredient to produce a foaming beverage, such as cappuccino.

9 Claims, 9 Drawing Sheets

U.S. PATENT DOCUMENTS

| | | | |
|---|---|---|---|
| 3,027,257 A | | 3/1962 | Shenkenberg |
| 3,065,076 A | | 11/1962 | Wenner et al. |
| 3,185,580 A | | 5/1965 | Hanrahan |
| 3,238,045 A | | 3/1966 | Damisch, Jr. et al. |
| 3,248,226 A | | 4/1966 | Stewart |
| 3,291,614 A | | 12/1966 | Tumerman et al. |
| 3,300,315 A | | 1/1967 | Nava et al. |
| 3,321,318 A | | 5/1967 | Giddy |
| 3,331,306 A | | 7/1967 | Hutton et al. |
| 3,354,049 A | | 11/1967 | Christensen |
| 3,385,710 A | * | 5/1968 | Dominique et al. ............ 426/93 |
| 3,391,003 A | | 7/1968 | Armstrong et al. |
| 3,443,959 A | | 5/1969 | Cibolt |
| 3,555,698 A | | 1/1971 | Boer |
| 3,738,412 A | * | 6/1973 | Nezbed et al. ............. 159/48.1 |
| 3,740,232 A | * | 6/1973 | Purves et al ................ 426/453 |
| 3,956,521 A | | 5/1976 | Pisecky et al. |
| 3,987,715 A | | 10/1976 | Muller |
| 4,215,801 A | | 8/1980 | Newman et al. |
| 4,318,932 A | | 3/1982 | Ewing et al. |
| 4,466,559 A | | 8/1984 | Loader |
| 4,490,403 A | | 12/1984 | Pisceky et al. |
| 4,657,767 A | * | 4/1987 | Meade ....................... 426/471 |
| 4,885,848 A | | 12/1989 | Christensen |
| 4,980,193 A | | 12/1990 | Tuason, Jr. et al. |
| 5,024,848 A | | 6/1991 | Little |
| 5,149,558 A | | 9/1992 | Little et al. |
| 5,154,111 A | | 10/1992 | Luciano |
| 5,192,002 A | | 3/1993 | Reese et al. |
| 5,284,674 A | | 2/1994 | Fazio |
| 5,650,186 A | | 7/1997 | Annoni et al. |
| 5,773,061 A | | 6/1998 | Getler et al. |
| 5,839,207 A | | 11/1998 | Christensen et al. |
| 5,839,610 A | * | 11/1998 | Reese et al. ............. 222/129.3 |
| 5,918,768 A | | 7/1999 | Ford |
| 5,928,703 A | | 7/1999 | Chmiel et al. |
| 6,183,800 B1 | | 2/2001 | Van Straten et al. |
| 6,250,506 B1 | | 6/2001 | Geiger et al. |
| 6,277,429 B1 | * | 8/2001 | Zeller et al. ................. 426/594 |
| 6,382,470 B1 | | 5/2002 | Hu et al. |
| 6,391,361 B1 | | 5/2002 | Peters et al. |
| 6,516,973 B2 | | 2/2003 | Chrisman et al. |
| 6,541,056 B1 | | 4/2003 | Song-Bodenstab et al. |
| 6,777,014 B2 | * | 8/2004 | Singh ......................... 426/569 |

FOREIGN PATENT DOCUMENTS

| | | |
|---|---|---|
| DK | 9901622 A | 11/1999 |
| EP | 0049963 A1 | 4/1982 |
| EP | 458310 A | 11/1991 |
| GB | 2255703 A | 11/1992 |
| GB | 2311206 A | 9/1997 |
| IE | 73466 B | 6/1997 |
| JP | 410004878 | 1/1998 |
| JP | 411056233 | 3/1999 |
| WO | WO 98/06274 | 2/1998 |

OTHER PUBLICATIONS

Reference Manual for U.S. Milk Powders. Published by the U.S. Dairy Export Council. 2001. pp. 23-39.*
Pisecky. "Handbook of Milk Powder Manufacture". 1997. pp. 64, 65, 112, 113, 124-127, 154, 155, 164-167, 196, and 197.*
Celestino et al. The Effect of Refrigerated Storage of Raw Milk on the Quality of Whole Milk Powder Stroed for Different Periods. International Dairy Journal. &. 1997. pp. 119-127.*
United States Deparmtent of Agriculture, Agricultural Marketing Service, Dairy Division, United States Scorched Particle Standards for Dry Milk, Effective Jan. 26, 1951.
United States Deparmtent of Agriculture, Agricultural Marketing Service, Dairy Division, United States Sediment Standards for Milk and Milk Products, Effective Sep. 1, 1977.
United States Deparmtent of Agriculture, Agricultural Marketing Service, Dairy Division, USDA Specifications for Instant Dry Whole Milk, Effective Jan. 1993.
United States Deparmtent of Agriculture, Agricultural Marketing Service, Dairy Programs, United States Standards for Grades of Nonfat Dry Milk (Spray Process), Effective Feb. 2, 2001.
United States Deparmtent of Agriculture, Agricultural Marketing Service, Dairy Programs, United States Standards for Instant Nonfat Dry Milk, Effective Feb. 2, 2001.
United States Deparmtent of Agriculture, Agricultural Marketing Service, Dairy Programs, United States Standards for Grades of Dry Whole Milk, Effective Apr. 13, 2001.
AMS News Release, www.ams.usda.gov/news/008-01.htm, Becky Unkenholz, USDA Revises Standards for Dry Whole Milk, Washington, Mar. 13, 2001.
New Dims: Whey Based Powdered Milk; http://web.archive.org/web/19991012235942/http://www.bushco.com/newdims.htm, Product Profile New Dims A Superb Milk Alternative.
Hormel Foods. Glossary of Kitchen and Food Terms, The word "Creamer". Online webpage http://www.hormel.com/kitchen/glossary.asp?id=35516&catitemid= Publication date unknown.
Brio by Zanussi; Vendor's Exchange International, Inc.; Brio maximum performance in minimum space; http://web.archive.org/web/19980514210512/veii/brio.htm, pp. 1-3.
Catherine Mary Teehan; Factors Affecting the Coffee Stability of Instant Whole Milk Powder, 1997, pp. 1-128.
Carl W. Hall and T.I. Hedrick; *Drying of Milk and Milk Products*, Carl W. Hall and T.I. Hedrick, The Avi Publishing Company, 1971, pp. 1-337.
Dr. Ing. Jan Pisecky, *Handbook of Milk Powder Manufacture*, by, Niro A/S, 1997, pp. 1-261.
Maple Island Product Information Bulleting for instant Non-fat Dry Milk Agglomerated Process, Maple Island, Inc., Sep. 28, 2000, 2 pages.
Phillip S. Tong, *Product Development for IFT 2000*, Abstract I; http://www.cdrf.org/content.asp?contentID=117.
Phillip S. Tong, *Coffee Stability*, Abstract II; http://www.cdrf.org/content.asp?contentID=117.
Malak M. El-Shafei, et al., *Effect of the drying process on the nutritive value of milk. Part 1. Biochemical composition*, Die Nahrung, 1988, 32(6), pp. 553-557.
Dr. P.M. Kelly, *Coffee-Stability of Dried Creamers*, End of Project Report 1998, Dairy Products Research Centre, pp. 1-17.
Yehia A. El-Samragy, et al., *Production of ultrafiltered skim milk retentate powder. 2. Functional Properties*. Journal of Dairy Science, vol. 76, No. 10, 1993, pp. 2886-2890.
Humboldt Creamery, Technical Data Sheet Extra Grade Agglomerated Instant Non-fat Dry Milk, (Low Heat-Kosher), Aug. 26, 2002.
James Kelly, et al., *Influence of Processing Variables on the Physiochemical Properties of Spray Dried Fat-Based Milk Powders*, Lait 82, INRA, EDP Sciences, 2002, pp. 401-412.
Yehia A. El-Samragy, et al., *Production of ultrafiltered skim milk retentate powder. 2. Functional Properties*. Journal of Dairy Science, vol. 76, No. 10, 1993, pp. 388-392.
USDA Specifications for Instant Dry Whole Milk, Jan. 1993, pp. 1-3.
United States Standards for Grades of Nonfat Dry Milk (Spray Process), Feb. 2, 2001, pp. 1-6.
Dr. P.M. Kelly, *Ingredient Development using a Pilot-Scale Tall-Form Spray Drier*, End of Project Report 1998: DPRC No. 18, Dairy Products Research Centre MoorePark, pp. 1-16.
Milk Powder (published 1939) copied on website (http://www.oldandsold.com/articles11/food-control-13.shtml. Author unknown.
United States Department Of Agriculture, Agricultural Marketing Service, Dairy Programs, United States Standards for Grades of Nonfat Dry Milk (Roller Process). Effective May 18, 1984.
Nonfat Dry Milk Definition. Published 1999. http://www.themilkywhey.com/products/product_frames/nonfat_dry_milk_definition.html.
Purina Dairy News. Published Sep. 2000. http://dairy.purinamills.com/09_00.html.
The Food Storage FAQ.1997. http://www.web.archive.org/web/19970331223456/http://ww.survival-center.com/foodfaq/ff7-milk.htm.

Dialog Database Abstract. CAB Abstracts. Acc. No. 19930462902. Effect of Technological Parameters on the Quality of Agglomerated Whole Milk Powder. Authors: Zbikowski et al. Polish Journal of Food and Nutrition Sciences, pp. 25-32, vol. 2 (2) 1993.

Dialog Database Abstract. Foodline. Acc. No. 359246. Preliminary Results of Milk Powder Deposition at Room Temperature on a Stainless Steel Surface . . . Authors: Deng et al. Food and Bioproducts Processing. 72 (c3), pp. 170-175 1994.

Database Abstract. FSTA Acc No. 1989 (11):P0108. Direct 'Low-No' Gas Combustion Heating of a Spray Drier During Milk Powder Manufacture, Authors: Kelly et al., Journal of the Society of Dairy Technology, 1989. vol. 42 (1), pp. 14-18.

Database Abstract. FSTA Acc No. 1985(12):P0029. Direct Gas-Fired Heating of a Pilot-Scale Spray Direr . . . Authors: Kelly et al., Journal of the Society of Dairy Technology, 1985, vol. 38 (2), pp. 55-59.

Database Abstract. FSTA Acc No. 1973(04):U0224. Specification for Dried Whole Milk, South Africa Bureau of Standard, 1972.

Dairy Ingredients Fax. . "Bulk Density" vol. 3, No. 1, Apr. 2001.

Amendment and Response for U.S. Appl. No. 10/877,469 dated Sep. 24, 2007 (20 pages) and Declarations of Wolfgang B. Pietsch and Harjit Singh (29 pages).

Office Action for U.S. Appl. No. 10/877,469 dated Mar. 23, 2007 (24 pages).

Submission in Support of a Request for Continued Examination and USDEC-Publications-Reference Manual for U.S. Milk Powders for U.S. Appl. No. 10/877,469 dated Jan. 23, 2007 (16 pages).

Final Office Action for U.S. Appl. No. 10/877,469 dated Oct. 23, 2006 (21 pages).

Response to Office Action for U.S. Appl. No. 10/877,469 dated Sep. 19, 2006 (23 pages).

Office Action for U.S. Appl. No. 10/877,469 dated Jun. 29, 2006 (21 pages).

Appeal Brief for U.S. Appl. No. 10/877,469 dated Apr. 19, 2006 (72 pages).

Advisory Action for U.S. Appl. No. 10/877,469 dated Dec. 28, 2005 (3 pages).

Response to Final Office Action for U.S. Appl. No. 10/877,469 dated Dec. 13, 2005 (42 pages).

Examiner Interview Summary for U.S. Appl. No. 10/877,469 dated Nov. 9, 2005 (3 pages).

Final Office Action for U.S. Appl. No. 10/877,469 dated Sep. 20, 2005 (11 pages).

Amendment/Response to Office Action for U.S. Appl. No. 10/877,469 dated Aug. 25, 2005 (37 pages).

Office Action for U.S. Appl. No. 10/877,469 dated May 26, 2005 (18 pages).

Third-Party Requester, Sara Lee's Comments Addressing Issues Raised by Applicant's Aug. 28, 2007 for Reexamination Control No. 95/000238 dated Sep. 27, 2007 (41 pages) and Declaration of Luningning ("NINI") Virtusio (2 pages).

Amendment and Response for Reexamination Control No. 95/000238 dated Aug. 29, 2007 (58 pages) and Declarations of Wolfgang B. Pietsch, Ramesh C. Chandan and Harjit Singh (60 pages).

Office Action for Reexamination Control No. 95/000238 dated Jun. 29, 2007 (42 pages).

Order Granting Inter Partes Reexamination Control No. 95/000238 dated Jun. 29, 2007 (70 pages).

Replacement Request for Inter Partes Reexamination Control No. 95/000238 dated Apr. 20, 2007 (273 pages).

Original Request for Inter Partes Reexamination Control No. 95/000238 dated Mar. 8, 2007 (156 pages).

*Nature's First Inc.* vs. *Sara Lee Corporation* and *Canteen Vending Services, Inc.* Civil Action No. 2:06cv284-TJW—Sara Lee Corporation's and Canteen Vending Services, Inc.'s Preliminary Invalidity Contentions dated May 21, 2007 (129 pages).

*Nature's First Inc.* vs. *Sara Lee Corporation* and *Canteen Vending Services, Inc.* Civil Action No. 2:06cv284-TJW—Nature's First's First Amended Objections and Responses to Sara Lee's First Set of Interrogatories dated Jul. 11, 2007 (redacted) (19 pages).

United States Deparmtent of Agriculture, Agricultural Marketing Service, Dairy Division, United States Standards for Grades of Instant Nonfat Dry Milk, Effective Aug. 7, 1996, pp. 1-4.

Final Office Action for U.S. Appl. No. 10/877,469 dated Nov. 15, 2007 (36 pages).

Office Action for Reexamination, Reexam Control No. 95/000238 dated Jul. 17, 2008 (182 pages).

Response to Office Action for U.S. Appl. No. 10/877,469 dated May 6, 2008 (23 pages).

Third-Party Requester, Sara Lee's Comments Addressing Issues Raised by Applicant's Aug. 17, 2008 Comments dated Sep. 19, 2008 as entered in Reexamination Control No. 95/000238 (29 pages).

Patent Owner's Response to Office Action dated Aug. 17, 2008 as entered in Reexamination Control No. 95/000238 (88 pages).

Office Action for U.S. Appl. No. 10/877,469 dated Aug. 1, 2008 (34 pages).

Submission in Support of a Request for Continued Examination for U.S. Appl. No. 10/877,469 dated Dec. 1, 2008 (69 pages).

Submission in Support of a Request for Continued Examination for U.S. Appl. No. 11/214,703 dated Sep. 25, 2008 (33 pages) and Declarations of Harjt Singh , Wolfgang B. Pietsch and Ramesh C. Chandan including Exhibit 1(29 pages).

Third-Party Requester, Sara Lee's Comments Addressing Issues Raised by Applicant's Aug. 17, 2008 Comments including Exhibit 1 (29 pages).

Amendment and Response for Reexamination Control No. 95/000238 dated Aug. 17, 2008 (44 pages) including Appendix and Declarations of Wolfgang B. Pietsch, Harjit Singh and Ramesh C. Chandan (39 pages).

Office Action for U.S. Appl. No. 10/877,469 dated Mar. 20, 2009 (27 pages).

Definition of "Agglomerated", www. dictionary.com, 2009 (http://dIctinary.reference.com?q=Agglomerated&r=66) (3 pages).

Second Action Closing Prosecution dated Sep. 17, 2009 in U.S. Appl. No. 95/000,238, U.S. Patent and Trademark Office. (68 pages).

www.humboltcreamery.com/tds/Agglomeratd Instant Non Fat.pdf Revised Apr. 28, 2006 (2 pages).

\* cited by examiner

METHOD FOR PREPARING CONSUMABLE VENDING MACHINE BEVERAGE

CROSS REFERENCE TO RELATED APPLICATIONS

This application is a division of co-pending U.S. patent application Ser. No. 10/877,469 filed Jun. 25, 2004, currently pending, which is a continuation of U.S. patent application Ser. No. 09/898,968 filed Jul. 3, 2001 and issued on Aug. 17, 2004 as U.S. Pat. No. 6,777,014 B2.

FIELD OF THE INVENTION

This invention relates to the use of agglomerated/freeze dried milk powder in beverage such as coffee and tea as an alternative to artificially made coffee whiteners and liquid milk.

BACKGROUND OF THE INVENTION

The concept of using liquid milk in coffee and tea has been prevalent for over a hundred years.

The use of milk substitutes in powder form for coffee originated about 40 years ago. These milk substitutes made as "coffee-whiteners" were formulated with corn syrup solids, hydrogenated oils (for fat), artificial coloring and preservatives. However, ironically nobody has applied the direct use of dry milk powder in coffee or tea.

There are several reasons for this:
1. Most milk powders are processed and dried through single stage spray dryers; with applications being limited to reconstituting; baking, use in confectionary and being used as additive to soup mixes, etc. A powder that is dried in a single stage spray dryer has limited solubility and tends to clump up if used in a vending machine or if it was directly used in a hot beverage.
2. The knowledge and use of the "Agglomeration Technology" that now enables the product to be more soluble has also been limited. Agglomeration of milk or other dry powder ingredients enables the products to be more soluble and more easily dispensable and free flowing. Most milk agglomerated to date has been used for drinking purposes, with occasional use as a source for making other beverage products, such as protein shakes, etc.
3. The agglomeration process is also expensive and the equipment investment is substantial. This high costs has reduced the availability of the process and therefore has limited new innovation and applications of this technology.

Dry Milk Powder, agglomerated or otherwise as presently available in Bulk or consumer packaging is used primarily for reconstitution, baking, mixing or confectionary needs. No application has been developed or used for purposes of using the milk powder 100% directly in vending machines for beverage purposes.

SUMMARY OF THE INVENTION

The removal of water from milk can result in various dairy ingredients, from condensed milk, to cream, to butter, to whole milk and skim powder. Also, the removal of water from milk offers the manufacturer significant reduction in volume (about 87% of all milk is water), which not only saves in handling and transportation costs but extends the life of the products as much as 18 months, when packaged appropriately.

Over the years as the technology of evaporating and spray drying has evolved from transforming liquid ingredients into a dry powdered form or particle form, so have the applications of using these products.

It is not only milk that is spray dried, but hundreds of other products are also spray dried including eggs; ice cream mixes; coffee whiteners; soy powders and various fruits and vegetables.

The inventor has recognized the advantages of this dry powder technology; particularly where it pertains to milk and the subsequent use of "agglomeration technology" to enable the dry powdered product to be more soluble and easily dispersible, so that it may be applied in beverages such as coffee and tea as a substitute for liquid milk and non-dairy whiteners.

To accomplish the invention, dry milk powder is obtained from whole milk or skim milk. To obtain skim milk powder, the whole milk is first separated to take out the fat (cream). It is then pasteurized and pumped to an evaporator to remove the water, which condenses the milk to 40% to 50% solids.

From there it is pumped to a spray dryer, where the remaining water is removed and the product is dried to powder form (ideal moisture of 2.8% to 3.5%)

In order to achieve the right solubility and uniform particle size to mix in beverages such as coffee and tea without lumping or floating the milk needs to be further processed, such as in a two stage dryer or a separate agglomerator.

In this second drying chamber (known as a fluid bed system or agglomerator) air volumes, moisture, and temperatures can be controlled to achieve the desirable composition and functional properties of the powder.

This second stage of drying is called "agglomeration" of the powders. Agglomeration reduces powder surface area, and provides an open, heavier structure which allows for more even hydration. An agglomerated product offers better and faster dispersion when it is introduced into beverages.

When applied through this production process, using controlled air volumes, moisture and temperatures one is able to achieve a product that when mixed with water dissolves essentially instantly. It is this use of the agglomeration technology when applied to milk that enables the dry milk powder to not only be easily reconstituted for drinking purposes, but can be marketed as "Real Milk" for the use in beverage and vending purposes. There remains no lumping or floating of product versus if it was only spray dried in a single system. It is also a much more free flowing product that does not bridge or cake when dispensed through automatic vending machines.

The inventor has further identified that non fat dry milk powder when manufactured and agglomerated should have a particle bulk density between 0.25 g/cc and 0.34 g/cc; with ideal initial bulk density of 0.28 g/cc; combined with the other controlled factors it is most easily dispersible and free flowing for purposes of adding to a hot beverage whether through a vending machine or directly.

The final product ideally should have moisture ratio of between 2.8% to 3.5%, and scorched particles mass between 7.5 mg and 15.0 mg. A higher scorched particle mass will result in floaters in the beverage and like lumping will be considered adversely by the consumer.

Therefore, a main objective of this invention is to introduce an ideally manufactured agglomerated milk powder that is easily soluble and dispersible for use in automatic vending machines and applicable as an alternative to liquid milk and non dairy powders for use in hot beverages.

These and other objects and features of the invention will be more readily understood from a consideration of the fol-

DETAILED DESCRIPTION OF THE PREFERRED EMBODIMENT

Figure 1:
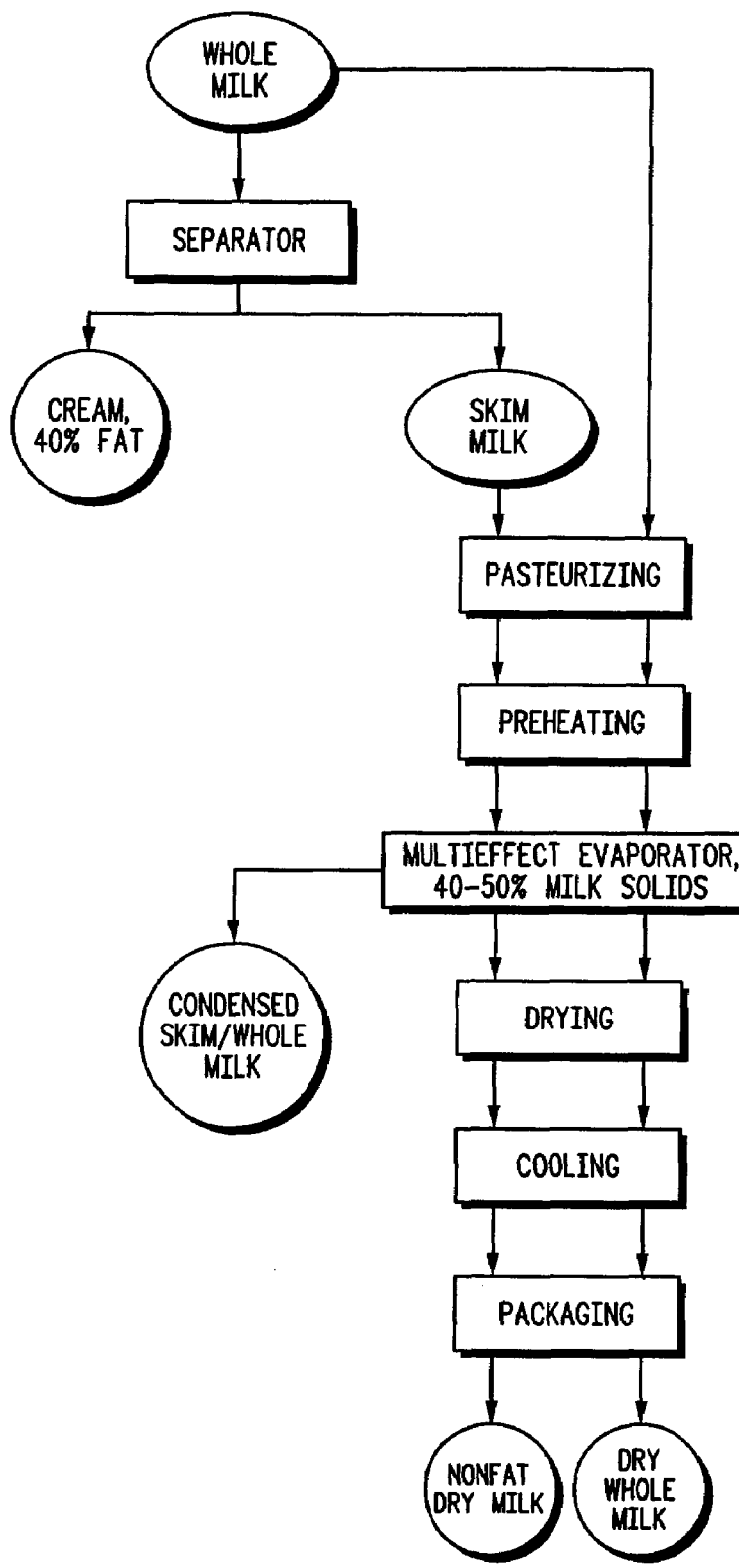
FIG. 1 is a block diagram showing a process for drying milk.

In order to practice the instant invention, it is preferred to agglomerate milk powder. FIG. 1 shows a process by which whole milk is processed. In one step, the milk is separated between milk and skim milk. In an additional or alternative step, the whole milk (or the skim milk) is pasteurized and then preheated. Thereafter, the preheated product is treated in a multi-effect evaporator, which yields 40%-50% milk solids. That product may be used as condensed skim or whole milk, or may be dried in a second stage process to result in a completely dried product after cooling and packaging.

It is widely accepted that liquid milk has a shelf-life of on the order of only two weeks, and that dried powdered milk has a shelf-life of up to two years if packaged appropriately.

Figure 2:
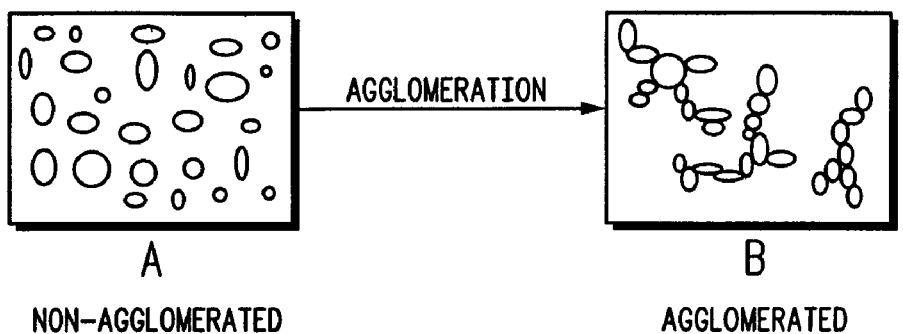
FIG. 2 is a diagrammatic representation of dried milk particles before and after agglomeration.

When it comes time to use the dried powdered milk, the solubility thereof in a beverage is critical to the desirability of the product to the consumer. It is, therefore, preferred that in the processing of the liquid milk into a dried powder, the product be agglomerated One way of accomplishing this is through the use of a multi-stage dryer. In a first stage, a spray dryer is used, and in a second stage a fluid bed dryer is employed. Spray drying involves transferring a flowable medium such as liquid milk into a drying chamber, where the liquid droplets are passed through a hot air stream. The objective is to produce a spray of high surface area to mass ratio droplets (ideally of equal size), then to uniformly and quickly evaporate the water. Non-agglomerated powder particles are shown at "A" to the left in FIG. 2, and agglomerated powder particles are shown at "B" to the right in FIG. 2.

EXAMPLE 1

Figure 3:
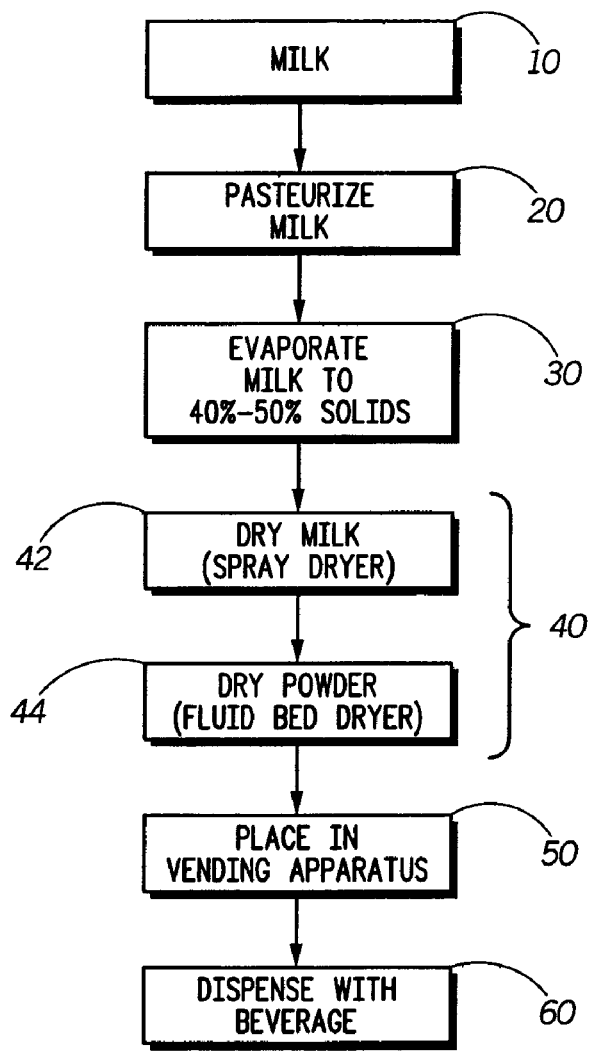
FIG. 3 is a flow diagram of an embodiment of the instant invention.

FIG. 3 shows the preferred process of the instant invention in which milk is provided at step 10. The milk is pasteurized at step 20 and evaporated to 40%-50% solids at step 30. The thus-condensed milk is introduced into a multi-stage dryer at step 40.

In an exemplary embodiment, the multi-stage dryer may include a spray dryer in a first stage 42 and a fluid bed dryer in a second stage 44. However, it is contemplated to be within the scope of the invention that any apparatus and/or procedure which results in agglomerated power can be used, and that the specific apparatus and procedures recited herein are done so by way of example and not by way of limitation. The result of the multi-stage process 40 is an agglomerated powder which can be either packaged or dispensed via a vending machine for consumer consumption. The specifics of agglomeration, and alternatives and variations thereof, are known to those who are skilled in the art and need not be discussed further herein. It is to be understood, however, that agglomerated product is preferred, since agglomeration reduces powder surface area, and provides an open, heavier structure which allows for more even hydration. The particles sink below the surface of the liquid, such as a beverage, and break apart, allowing smaller particles within the agglomerate to completely hydrate. This means better and faster dispersion within a beverage. While individual powder particles of typical food products are usually less than 100 microns, agglomerates are typically 250 to 400 microns. Bulk density decreases from approximately 42 pounds per cubic foot to approximately 28 pounds per cubic foot.

The agglomerated powdered milk is then packaged, transported through a distribution network and placed into automated vending machines (shown as step 50) to be dispensed on demand at step 60 with various beverages, such as coffee, tea, cappuccino and hot chocolate.

EXAMPLE 2

Figure 4:
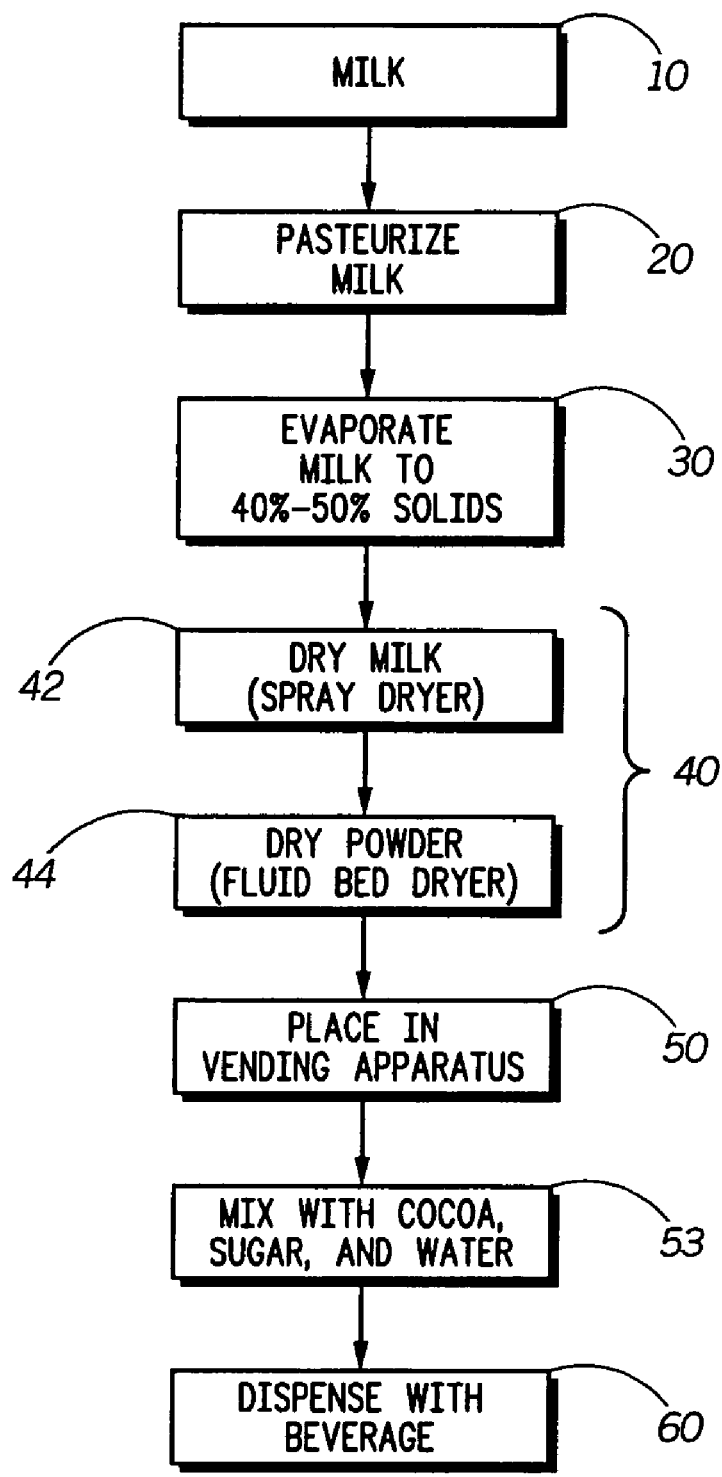
FIG. 4 is a flow diagram of an alternative embodiment of the instant invention.

The procedure for this example repeats the steps detailed in Example 1 but interposes the intermediate step 53, shown in FIG. 4, of combining the agglomerated milk powder with cocoa or chocolate powder, sugar and water, and then mixing and heating the mixture for consumption as a hot beverage.

EXAMPLE 3

Figure 5:
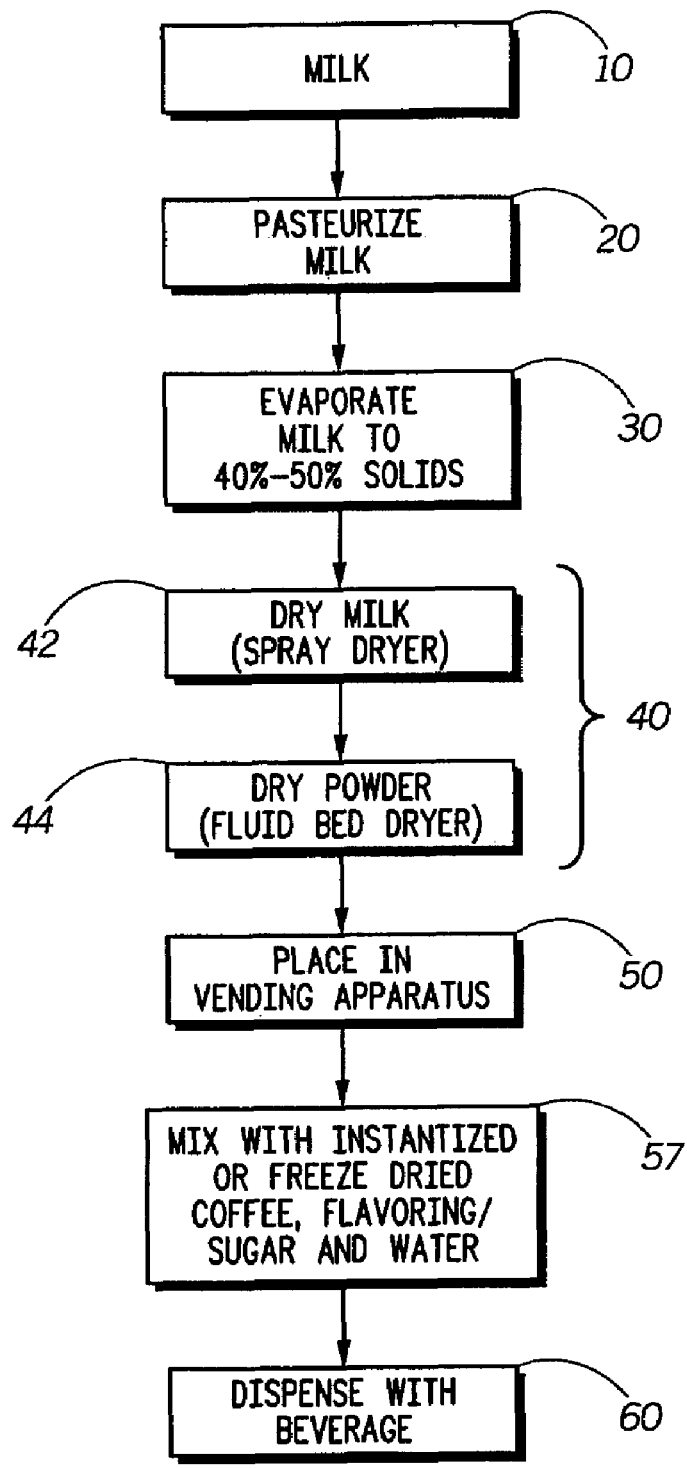
FIG. 5 is a flow diagram of a second alternative embodiment of the instant invention.

The procedure of FIG. 3 is followed, but the agglomerated milk powder is combined with ground coffee and water, then whipped or emulsified as known in the art, and heated for consumption as a cappuccino beverage, at step 57 in FIG. 5.

EXAMPLE 4

Figure 6:
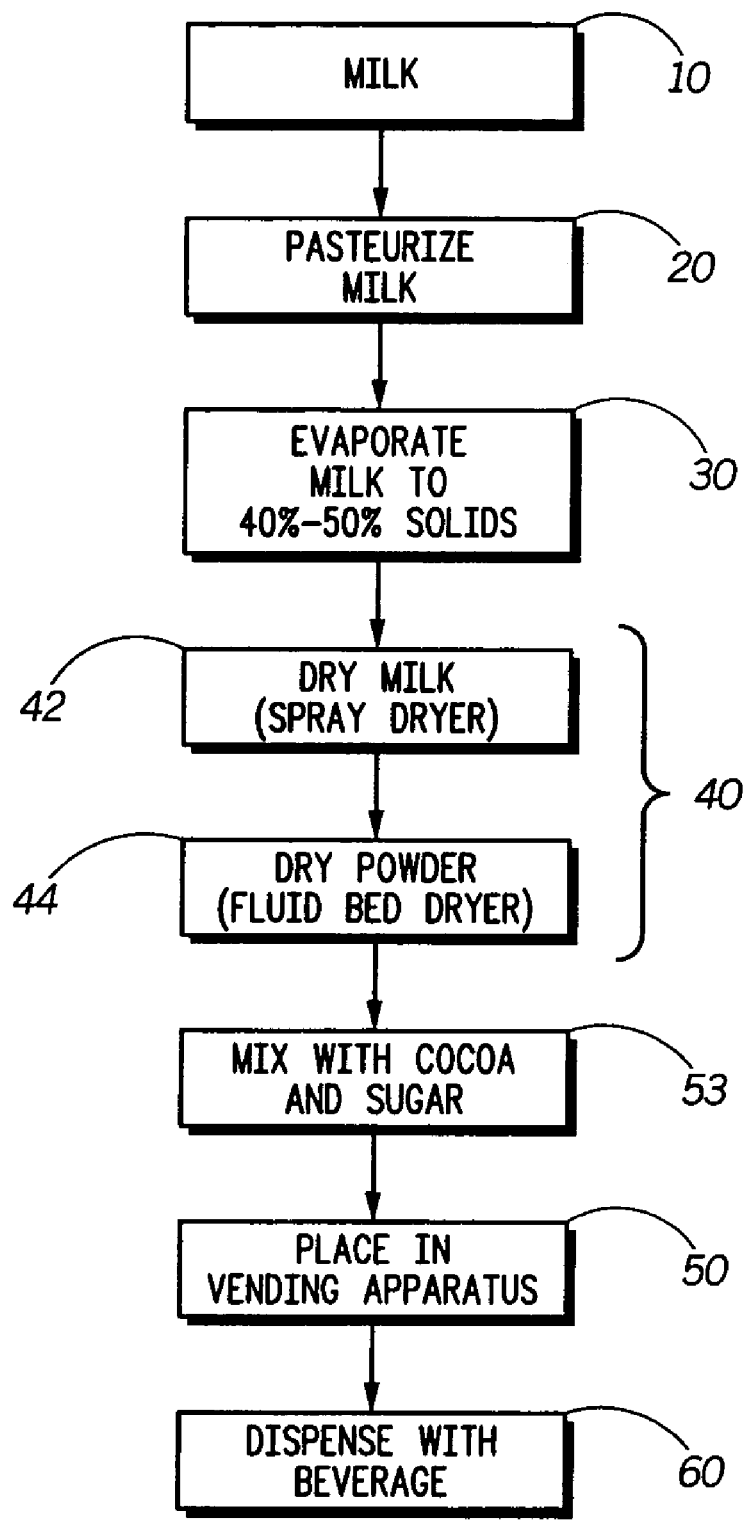
FIG. 6 is a flow diagram of a third alternative embodiment of the instant invention.

FIG. 6 shows a third alternative embodiment of the invention in which the powdered agglomerated milk is mixed with cocoa powder, sugar and any incidental preservative ingredient(s) prior to being placed in the vending apparatus to formulate an all natural hot chocolate beverage. Alternatively, the mixtures can be consumed directly without the use of a vending device. As such, steps 50 and 53 are essentially reversed, with the addition of water being deleted from step 53 and added to step 60. In this way, a more simplified vending procedure can be realized wherein a single serving quantity of combined powdered agglomerated milk, cocoa powder and sugar can be mixed with water by the vending machine without having to have separate stage compartments in vending channels for each of the separate ingredients.

EXAMPLE 5

Figure 7:
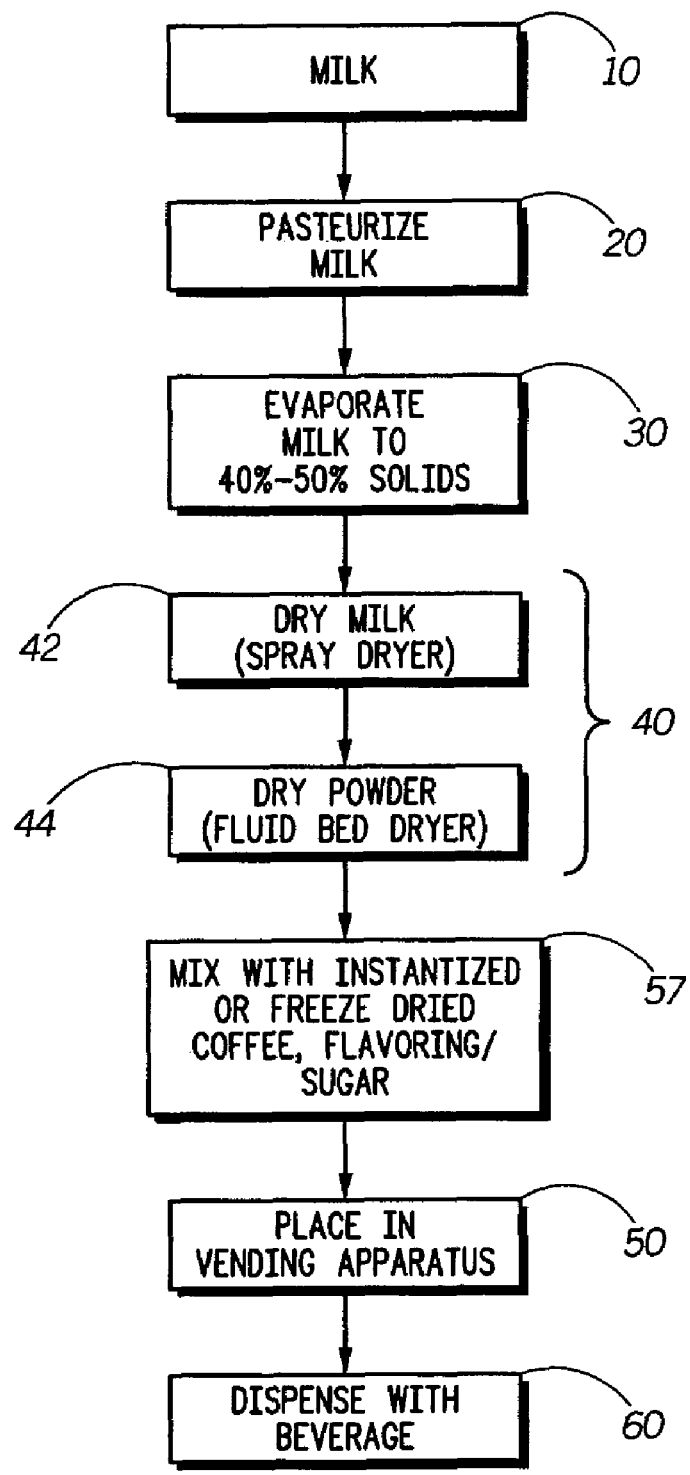
FIG. 7 is a flow diagram of a fourth alternative embodiment of the instant invention.

FIG. 7 shows a fourth alternative embodiment of the invention in which the powdered agglomerated milk is mixed with instantized or freeze dried coffee, flavoring (optional) and sugar prior to being placed in the vending machine, for direct consumption or for use in the vending machine to formulate an all natural cappuccino beverage. As such, steps 50 and 57 of FIG. 5 are reversed, with water being deleted at step 57 and added to step 60. In this way, the combined powdered agglomerated milk, coffee, flavoring (if any), and sugar (if any), can be combined as a mixture and stored in a single compartment within the vending machine and dispensed in single serving portions on demand.

EXAMPLE 6

Figure 8:
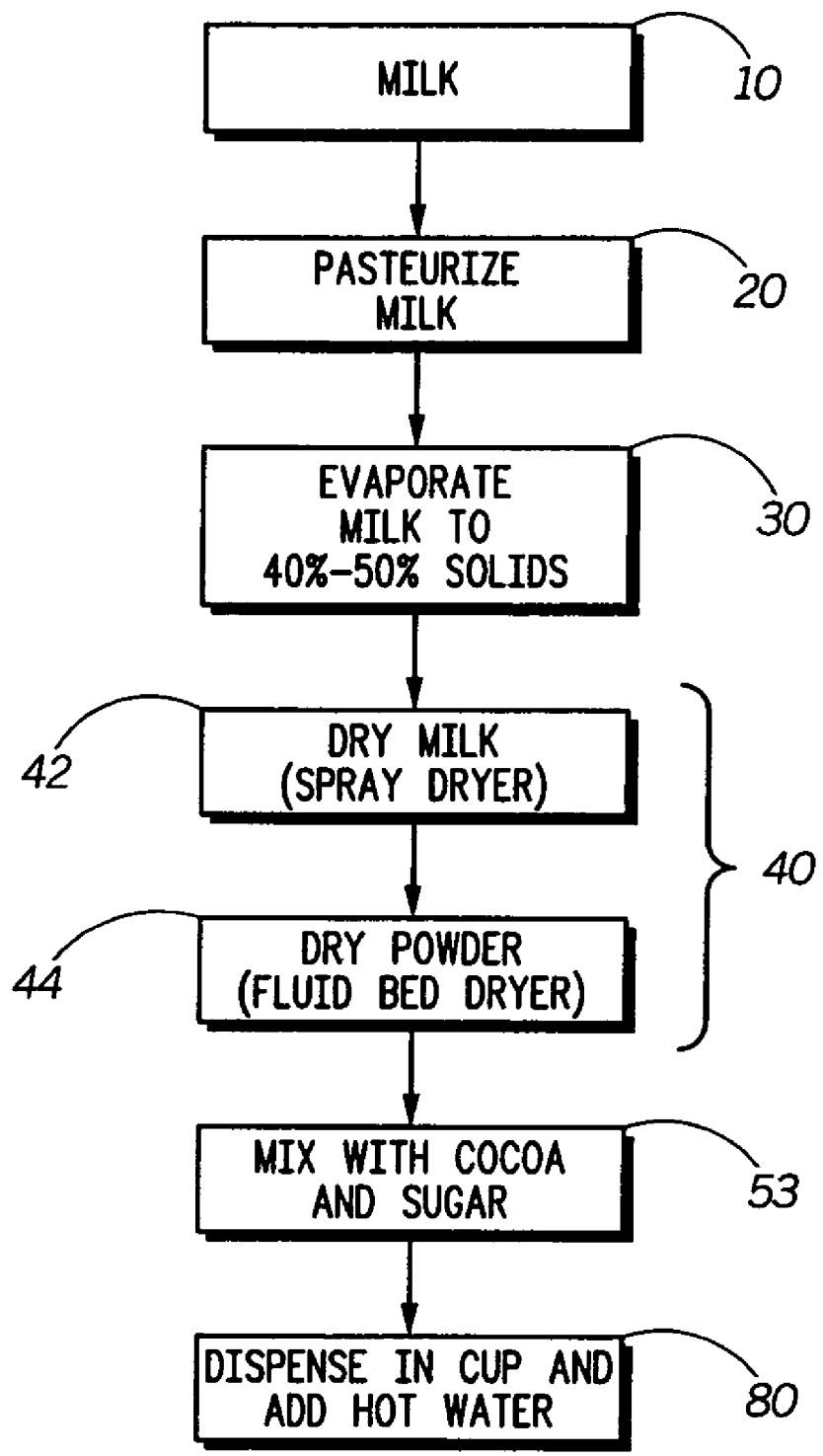
FIG. 8 is a flow diagram of a fifth alternative embodiment of the instant invention.
Figure 9:
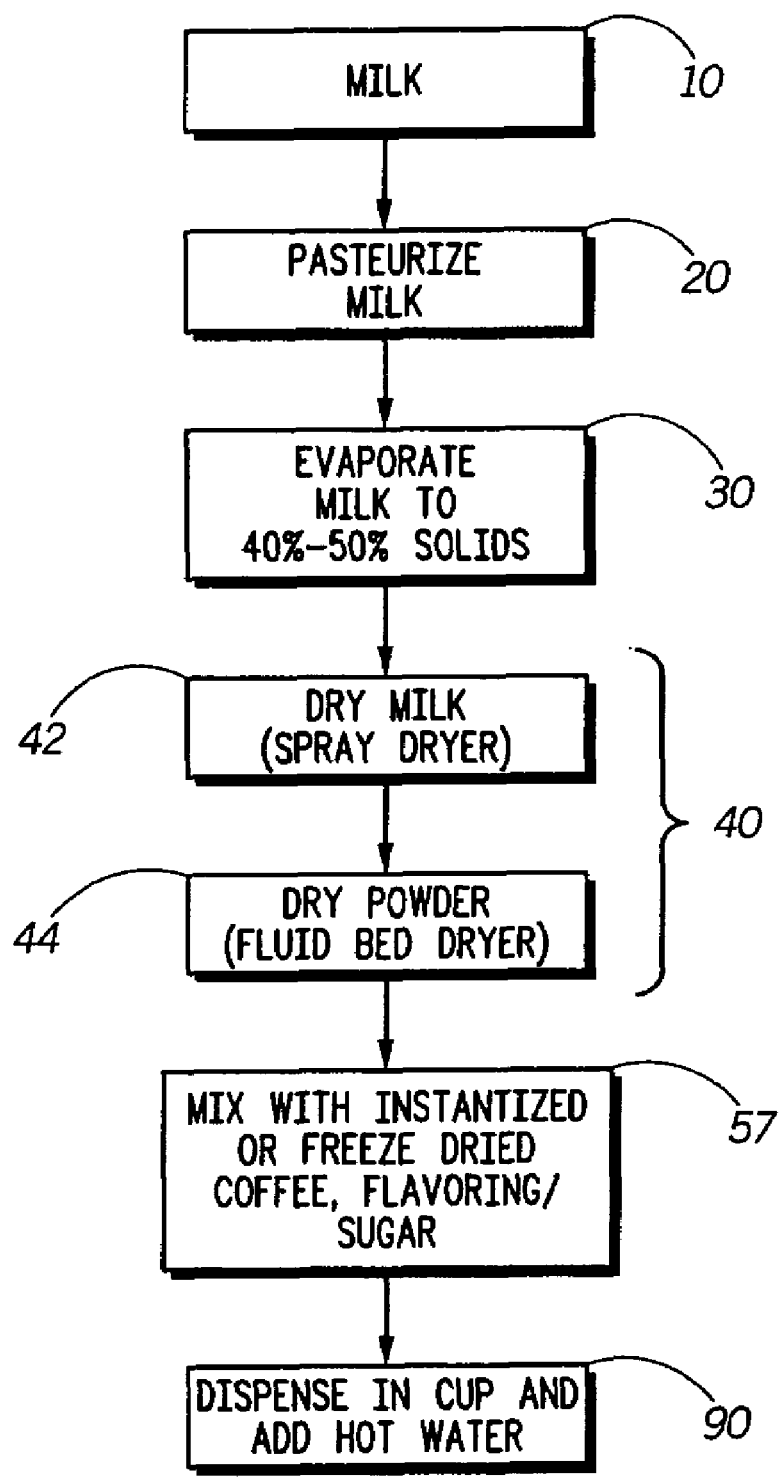
FIG. 9 is a flow diagram of a sixth alternative embodiment of the instant invention.

The agglomerated natural milk powder resulting from step 44 can be placed into any suitable container such as a consumer package for transportation and retail sale or other disposition. Moreover, as shown in FIGS. 8 and 9, respectively, the agglomerated natural milk powder resulting from step 44 can be mixed with cocoa powder (and sugar optionally, but not by a way of limitation), at step 53, and the resulting mixture then placed into packaging for distribution to consumer, whereupon, when desired, the consumers can place the mixture into a beverage cup and add water, as shown in step 80 in FIG. 8. Likewise, the agglomerated natural milk powder resulting from step 44 can be mixed with instantized or freeze dried coffee (and flavoring and/or sugar optionally, but not by a way of limitation) at step 57, and placed into a packaging for distribution to consumers. Thereafter, the mixture of instantized and/or freeze dried coffee and agglomerated natural milk powder can be dispensed into a beverage cup and mixed with hot water for consumption, as shown in Step 90 in FIG. 9. The packaging into which the agglomerated natural milk powder is placed can be a single serving package or a bulk container. Likewise, the agglomerated natural milk powder mixed with either cocoa powder or powdered coffee can be placed into single serving or bulk containers. Having described the invention, many modifications thereto will become apparent to those skilled in the art to which it pertains without deviating from the spirit of the invention as defined by the scope of the following claims.

EXAMPLE 7

Figure 10:
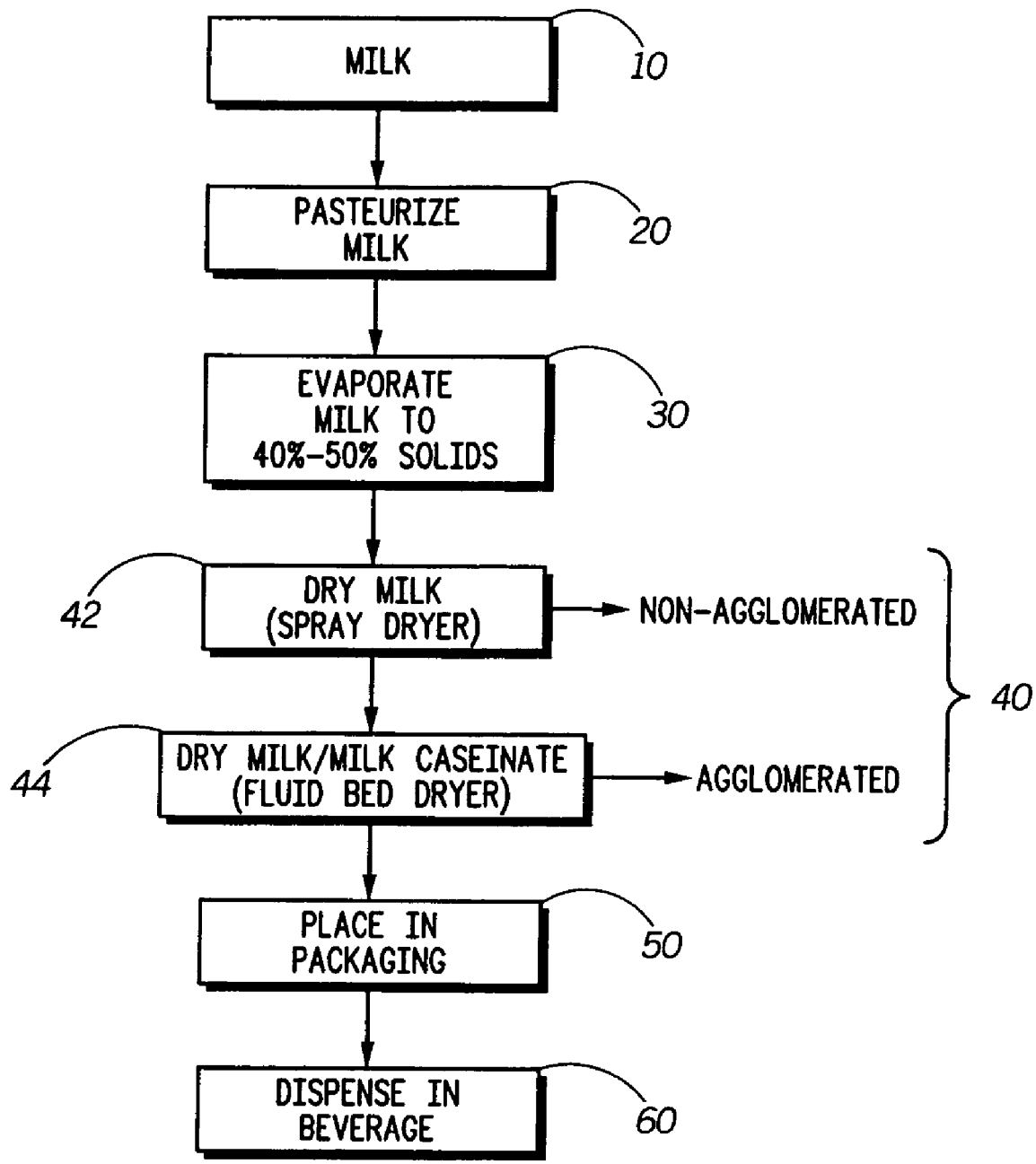
FIG. 10 is a flow diagram of a seventh alternative embodiment of the instant invention.

FIG. 10 shows an alternative embodiment of the invention in which the dry powdered milk (step 42) while being transferred from the spray dryer to the fluid bed dryer for agglomeration (step 44) is combined with two percent milk caseinates to enhance color profile on a natural basis enabling the finished product to be directly used as an agglomerated natural creamer for coffee; tea and hot beverages. All other processing parameters as applied in Example 1 continue to remain the same.

I claim:

1. A method for preparing a hot consumable beverage as part of operation of a vending machine, the method consisting of:
   providing hot water;
   providing an agglomerated non fat dry milk powder formulated for use in the vending machine, the agglomerated non fat dry milk powder consisting of dairy ingredients and having a scorched particle mass not greater than fifteen milligrams and a particle bulk density in the range of 0.25 g/cc to 0.34 g/cc;
   providing at least one additional ingredient that is independent of the agglomerated non fat dry milk powder and adds flavor when mixed with the hot water and the agglomerated non fat dry milk powder;
   mixing the hot water, the agglomerated non fat dry milk powder, and the at least one additional ingredient to produce a consumable beverage; and
   dispensing the consumable beverage.

2. The method of claim 1 wherein the step of mixing includes:
   whipping at least the hot water and the agglomerated non fat dry milk powder.

3. A method for preparing a hot consumable beverage as part of operation of a vending machine, the method comprising:
   providing hot water;
   providing an agglomerated non fat dry milk powder formulated for use in the vending machine, the agglomerated non fat dry milk powder consisting of dairy ingredients and having a scorched particle mass not greater than fifteen milligrams and a particle bulk density in the range of 0.25 g/cc to 0.34 g/cc;
   providing at least one additional ingredient that is independent of the agglomerated non fat dry milk powder and adds flavor when mixed with the hot water and the agglomerated non fat dry milk powder; and
   mixing at least the hot water, the agglomerated non fat dry milk powder, and the at least one additional ingredient to produce the consumable beverage.

4. The method of claim 3, wherein the at least one additional ingredient is at least one of cocoa powder, tea, coffee and sugar.

5. The method of claim 3, wherein the step of mixing further comprises whipping at least the hot water and the agglomerated non fat dry milk powder.

6. The method of claim 1, wherein the at least one additional ingredient is at least one of cocoa powder, tea, coffee and sugar.

7. The method of claim 2, wherein the at least one additional ingredient is coffee and wherein the consumable beverage is a cappuccino beverage.

8. The method of claim 1, wherein the at least one additional ingredient is combined with the agglomerated non fat dry milk powder prior to use in the vending machine, such that the at least one additional ingredient is provided together with the agglomerated non fat dry milk powder.

9. The method of claim 3, wherein the at least one additional ingredient is combined with the agglomerated non fat dry milk powder prior to use in the vending machine, such that the at least one additional ingredient is provided together with the agglomerated non fat dry milk powder.

* * * * *